United States Patent
Schulze et al.

(10) Patent No.: US 8,376,675 B2
(45) Date of Patent: Feb. 19, 2013

(54) MOVEABLE TIEDOWN

(75) Inventors: Greg James Schulze, Jamestown, ND (US); Gregory Albert Brekken, Jamestown, ND (US); Parker Dan Snow, Kensal, ND (US)

(73) Assignee: Goodrich, Corporation, Charlotte, NC (US)

( * ) Notice: Subject to any disclaimer, the term of this patent is extended or adjusted under 35 U.S.C. 154(b) by 439 days.

(21) Appl. No.: 12/485,573

(22) Filed: Jun. 16, 2009

(65) Prior Publication Data

US 2010/0316460 A1    Dec. 16, 2010

(51) Int. Cl.
B60P 7/08    (2006.01)

(52) U.S. Cl. .................................... 410/104; 410/106

(58) Field of Classification Search ............ 410/77, 410/80, 104, 105, 106, 110, 8; 24/265 CD, 24/115 K; 244/118.1, 137.1; 248/499
See application file for complete search history.

(56) References Cited

U.S. PATENT DOCUMENTS

| | | | |
|---|---|---|---|
| 3,306,234 A | 2/1967 | Hansen | |
| 3,392,954 A | 7/1968 | Malitte | |
| 3,652,050 A | 3/1972 | Marrujo | |
| 3,765,637 A | 10/1973 | Watts | |
| 3,906,870 A * | 9/1975 | Alberti | 410/79 |
| 3,986,459 A | 10/1976 | Riley | |
| 4,230,432 A | 10/1980 | Howell | |
| 4,396,175 A | 8/1983 | Long | |
| 4,493,470 A | 1/1985 | Engel | |
| 4,776,533 A | 10/1988 | Sheek | |
| 6,425,717 B1 | 7/2002 | Saggio | |
| 6,626,623 B2 * | 9/2003 | DeLay | 410/116 |
| 2008/0173755 A1 | 7/2008 | Benthien | |
| 2009/0274532 A1 | 11/2009 | Krostue | |

FOREIGN PATENT DOCUMENTS

DE    102007011611 A1    7/2008

OTHER PUBLICATIONS

German Office Action (German App. No. 102010015818.6), dated Jun. 27, 2011, pp. 1-5.
Translation of German Office Action (German App. No. 102010015818.6), dated Jun. 27, 2011, pp. 1-3.

* cited by examiner

*Primary Examiner* — Stephen Gordon
(74) *Attorney, Agent, or Firm* — Womble Carlyle

(57) ABSTRACT

A system for securing objects in an aircraft can comprise a structure in an aircraft having a plurality of receiving holes and a tie down. The tie down can comprise a housing and a fitting. The housing can have at least one engagement pin for selective positioning wherever the receiving holes are located. The fitting can be capable of receiving and securing a restraint to the housing and configured to rotate about the engagement pin to facilitate securing objects in an aircraft.

20 Claims, 15 Drawing Sheets

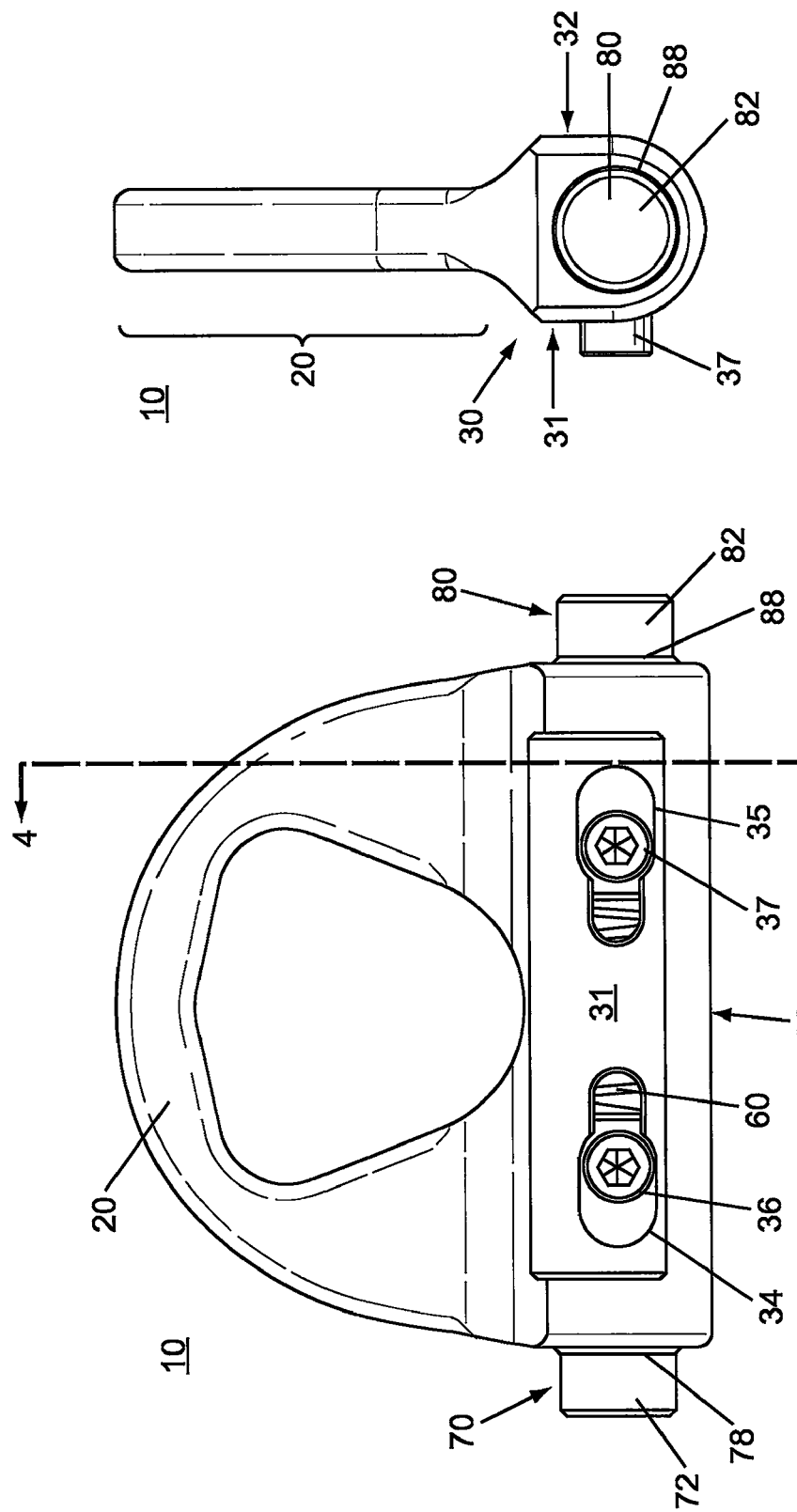

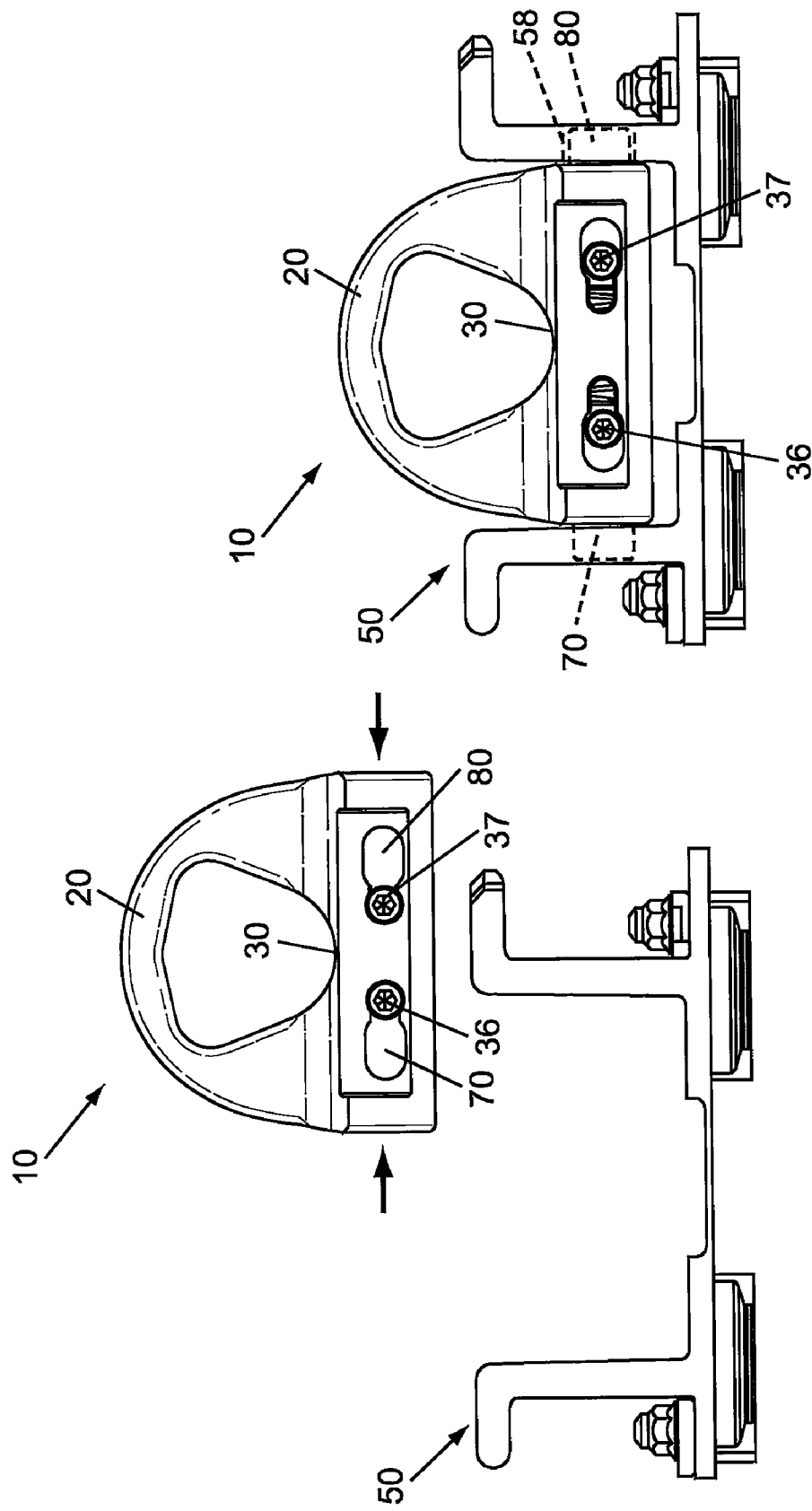

MOVEABLE TIEDOWN

FIELD OF THE INVENTION

The invention is directed to tie downs for securing cargo in aircraft.

BACKGROUND

Stabilizing cargo during shipment is an important objective of aircraft cargo transport systems. In addition, aircraft cargo transport systems should be flexible enough to adapt to conditions during loading, stowage and unloading of the cargo. Typically, cargo shipped by air is first loaded onto specially configured pallets, or into specially configured containers commonly referred to as Unit Load Devices ("ULDs"). Cargo is loaded, stowed and secured within the aircraft for shipment. The cargo deck, roller trays, and sidewalls of a cargo compartment typically include a plurality of restraint devices attached at various installation points located on the cargo deck and sidewalls that can be used to engage and secure cargo.

Two types of devices typically used to secure cargo during shipment are primary and supplemental restraint devices. Primary restraint devices are stationary and positioned at predetermined installation points on a cargo deck or roller tray. Predetermined installation points, however, may not provide optimal attachment locations for securing a ULD. Often, cargo may not fit within the ULD and thus may not fit within the predetermined installation points. Supplemental devices are moveable and can be fixed to any location capable of receiving a supplemental restraint. Attachment locations for supplemental devices may be best determined by which location best minimizes lateral or longitudinal movement of cargo. The loader is tasked with optimizing the use of primary and supplemental restraint devices available at the time of loading and stowage.

The attachment location that minimizes cargo movement, however, may result in damage to the supplemental restraint device and the aircraft. Restraint straps can attach from numerous directions and angles and can place non optimal forces on supplemental restraint devices. For example, the position of the supplemental restraint device on a cargo deck may not align with the direction the restraint strap extends from the cargo. The optimal attachment location, therefore, may not adequately or optimally distribute load from the restraint to the cargo deck. Excessive forces and resultant damage to a restraint device undermine cargo stability. Thus, the ability to adequately distribute the load from the restraint strap to the attachment locations facilitates cargo stabilization. Moveable supplemental restraint devices that are also adaptable to distribute loads from the restraint to the cargo deck provide the loader with the flexibility needed to optimize cargo stabilization.

While movable supplemental devices provide increased flexibility for a loader, the "moveable" nature of these devices could lead to greater theft, loss or misplacement.

Thus, there is a need for supplemental restraints that are capable of attachment to a variety of locations along a roller tray, adaptable to the circumstances of loading and stowage of the cargo and that have design features that discourage theft or loss.

SUMMARY OF THE INVENTION

A tie down secures objects in an aircraft having receiving holes. A tie down housing can include at least one engagement pin for selective positioning wherever the receiving holes are located. A fitting on the housing can be capable of receiving and securing a restraint strap to the housing. A fitting can be configured to rotate when the housing is positioned in the receiving holes.

BRIEF DESCRIPTION OF DRAWINGS

FIGS. 3A and 3B show front and side plan views of a first embodiment of a tie down.

FIGS. 7A, 7B, 7C, 7D, 7E, and 7F show a method of installing, securing and removing a tie down.

DESCRIPTION

Certain exemplary embodiments of the present invention are described below and illustrated in the accompanying Figures. The embodiments described are only for purposes of illustrating embodiments of the present invention and should not be interpreted as limiting the scope of the invention. Other embodiments of the invention, and certain modifications and improvements of the described embodiments, will occur to those of skill in the art, and all such alternate embodiments, modifications and improvements are within the scope of the present invention.

A system for securing objects in an aircraft can comprise a tie down capable of selective positioning where receiving holes are located. Receiving holes can be located on any structure in an aircraft. A structure having receiving holes can be a roller tray, caster tray, or ball tray. In addition, receiving holes can be found in other locations in the cargo area or deck, or the ball or caster panels typically used in the doorways of aircraft. For example, a receiving hole can be machined or formed within the cargo area or any structure as the need may arise.

Figure 1:
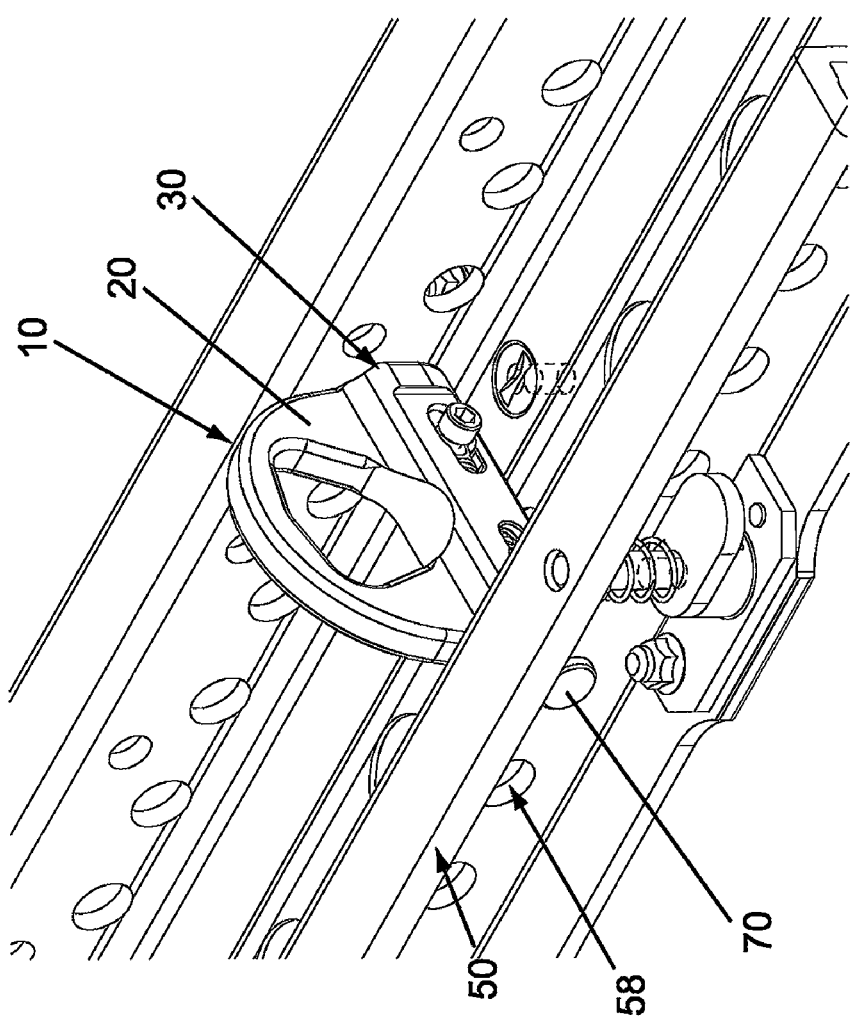
FIG. 1 is a top perspective view of a first embodiment of a tie down in a roller tray.
Figure 2A:
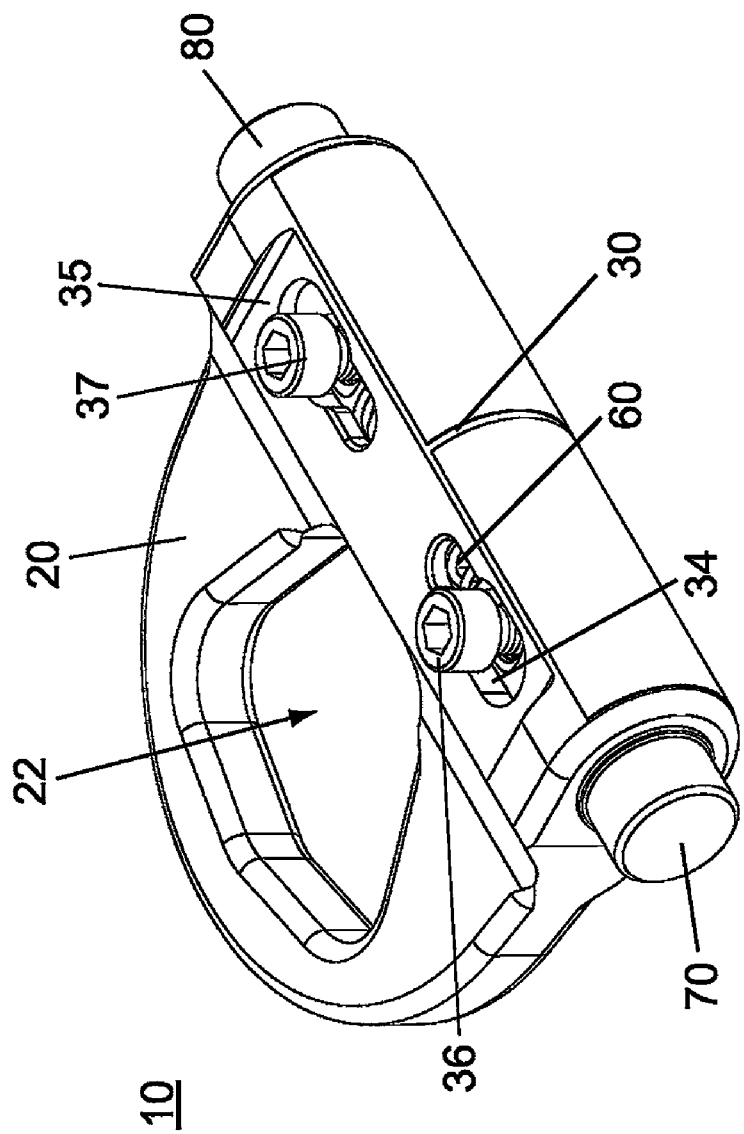
FIGS. 2A and 2B show front perspective and exploded assembly views, respectively, of a first embodiment of a tie down.

An embodiment of a system for securing objects in an aircraft can have a tie down 10 positioned in roller tray 50 where receiving holes 58 are located as shown in FIG. 1. A tie down 10 can rotate in the roller tray 50 to receive a restraint strap from a ULD (or other cargo requiring storage and securement) positioned anywhere on a cargo deck. For example, the ULD can be forward, aft, inboard, outboard, or any variations thereof relative to the position of the tie down 10. As shown in FIGS. 1 and 2A, a tie down 10 can have a fitting 20, housing 30 and first and second engagement pins 70 and 80 (the second engagement pin 80 is not shown in FIG. 1). The first and second engagement pins 70 and 80 can cooperate with, and allow rotation of, a tie down 10 in the roller tray 50, caster tray, ball tray, or other structure in an aircraft.

Figure 2B:
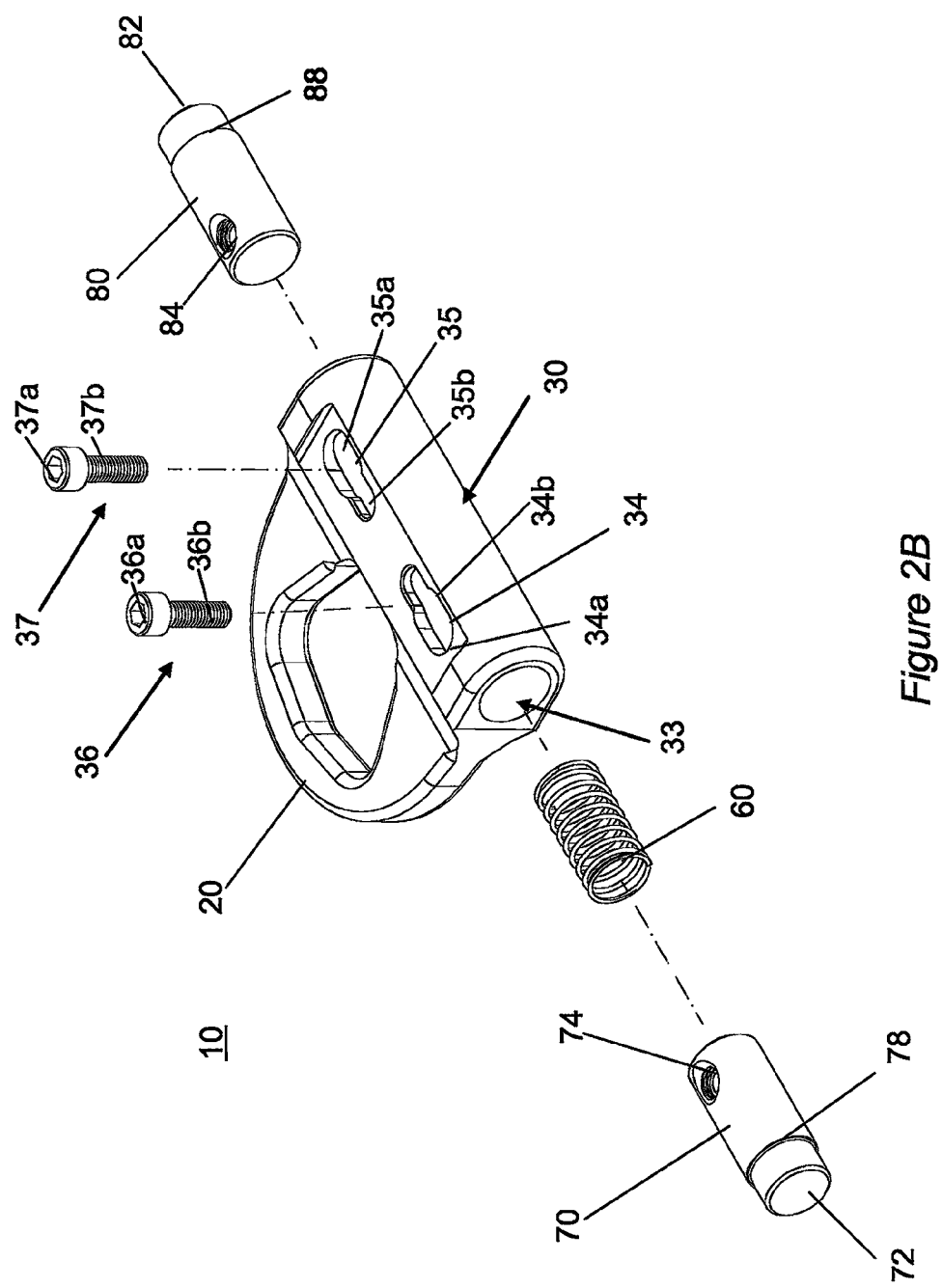
Figure 8:
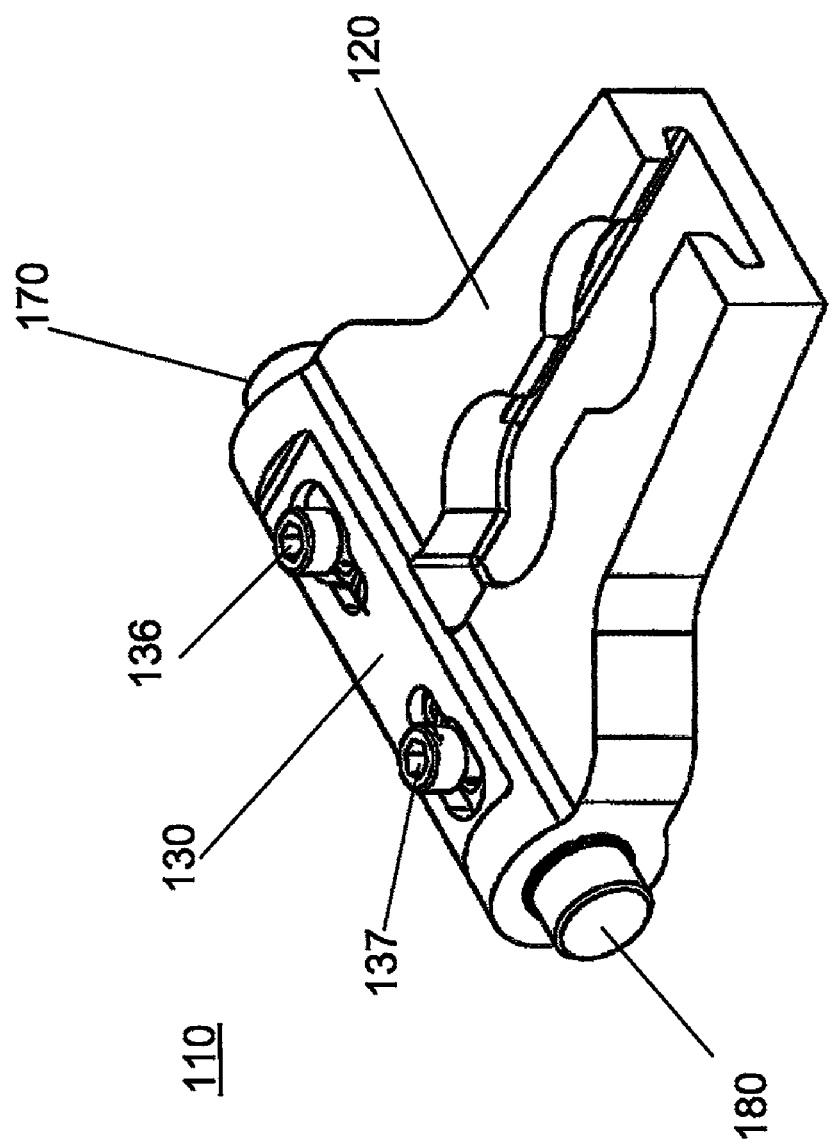
FIG. 8 shows a second embodiment of a tie down.
Figure 9:
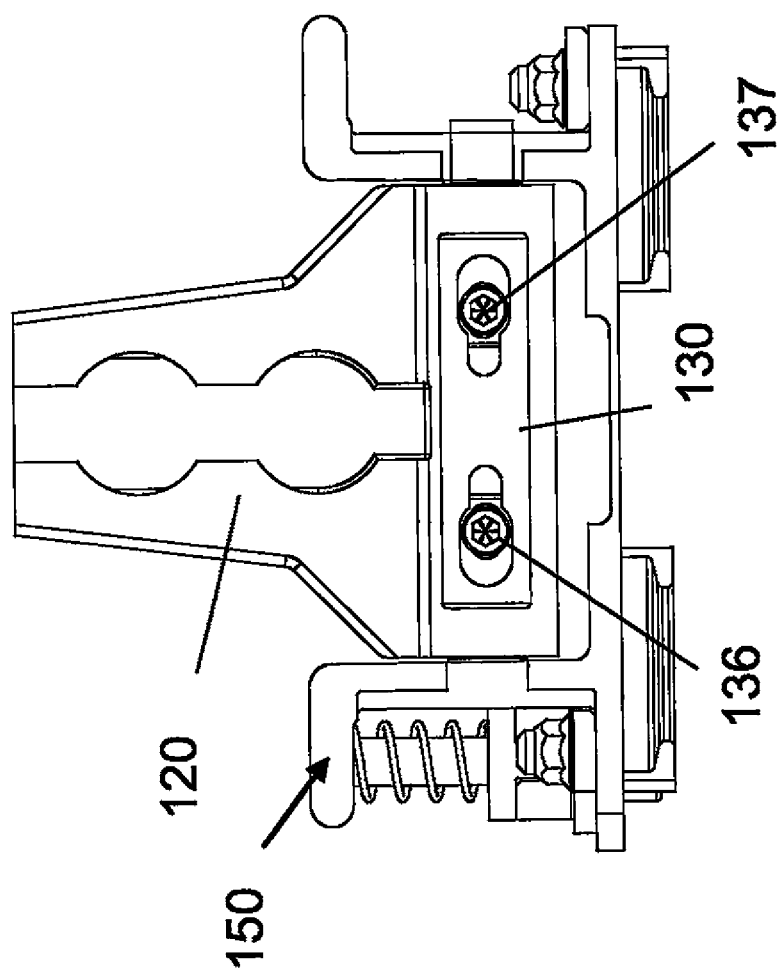
FIG. 9 shows a second embodiment of a tie down in a roller tray.
Figure 10:
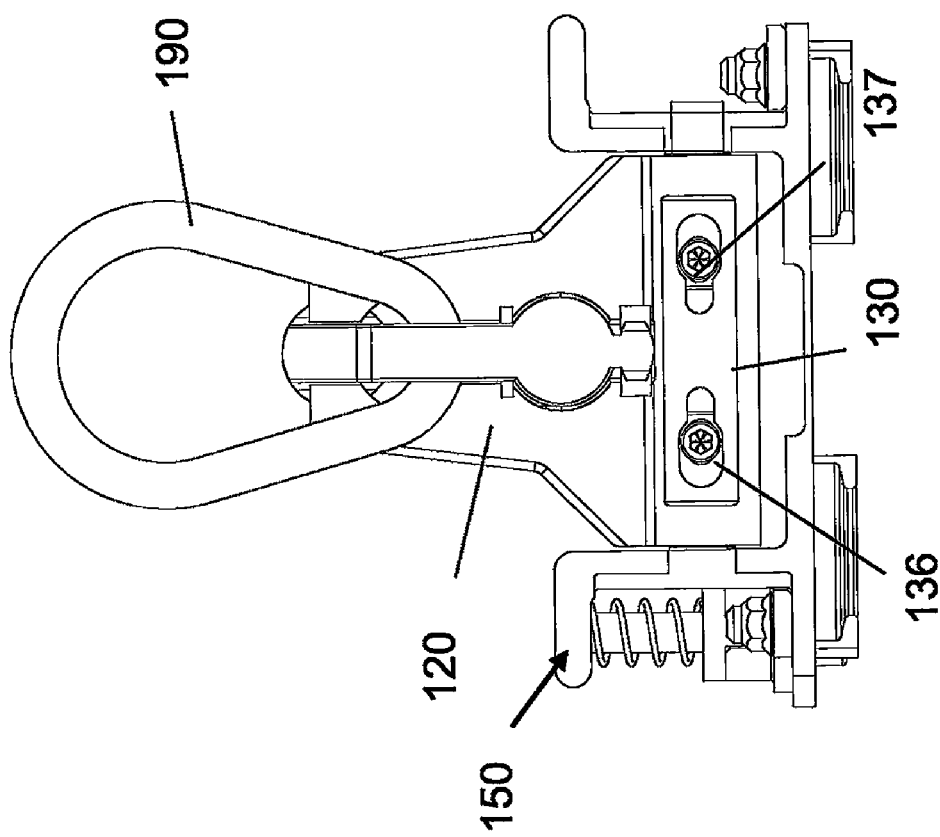
FIG. 10 shows a second embodiment of a tie down in a roller tray with a latch.

As shown in FIGS. 2A and 2B, the fitting 20 can be configured to receive any type of restraint to secure a ULD or other cargo during loading/unloading and flight. A restraint strap refers to any material that can attach to a fitting, including, the handle-shaped fitting represented in the first embodiment. A restraint strap can include, but is not limited to, a strap, band, rope, cord, cable, chain, braid, or wire. Restraint straps can also have a latch, hook, clasp, fastener, stud, or any other apparatus for attachment to a fitting. In the embodiment shown in FIG. 2A, a fitting opening 22 can have a trapezoidal shape and general curvilinear inner perimeter. In alternate embodiments, however, the fitting 20 can be a single-studded tie down, double-studded tie down (as shown in FIGS. 8, 9 and 10), circular link, pallet-lock shackle, ring, clasp, latch or other device capable of receiving and securing a restraint. The fitting 20 can be formed from anodized aluminum, stainless steel, graphite or other composite, metal alloys and/or any other rigid material. In still other alternate embodiments, the fitting 20 can be painted, or coated with a polytetrafluoroethylene, e.g., Teflon®. In other embodiments, the fitting 20 can be painted a color that contrasts with a roller tray 50, caster tray, ball tray, cargo deck or other structure for ease of identification.

Figure 4:
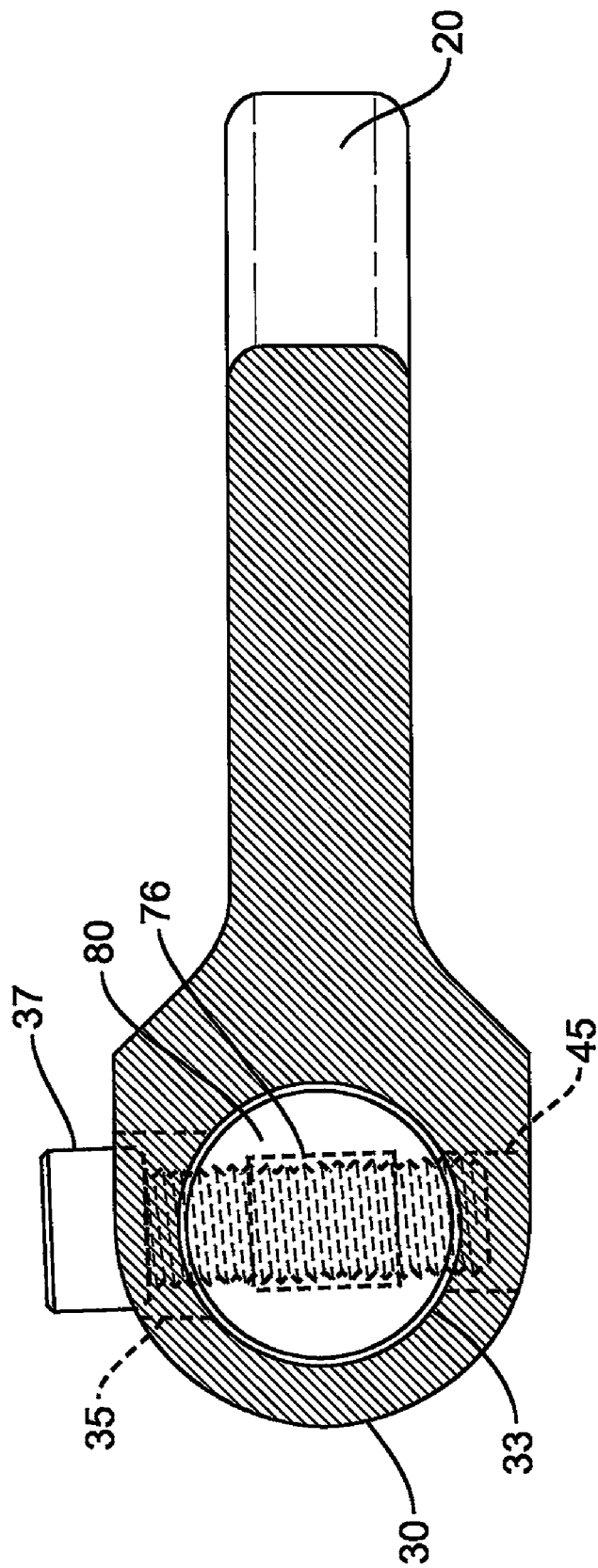
FIG. 4 shows a section view of a first embodiment of a tie down taken along a line 4-4 in FIG. 3A.

As shown in FIGS. 2B, 3A, 3B and 4, a housing 30 can have a plurality of slots 34 and 35. In the embodiment shown, these slots extend through to a cavity 33. In addition, rear slots can be positioned on the opposite side of the housing 30, and also open to the cavity 33. The rear slots can correspond in shape and position to the first and second front slots 34 and 35, respectively. (One rear slot 45 is shown in FIG. 4). In other alternate embodiments, the rear slot can have a shape different than the first and second front slots. For example, the rear slot can be a hole.

Slots 34 and 35 receive studs 36 and 37. The stud can be a threaded stud, screw, bolt pin, or other suitable structure. Studs 36 and 37 engage the first and second engagement pins 70 and 80 located within the cavity 33. Slots 34 and 35 can be configured to provide a locking feature when engaged by studs 36 and 37. Stud 36, for example, can have a first diameter portion 36a and a second, but smaller, diameter portion 36b. Similarly, slot 34 can have a first opening 34a, and a second, but smaller, opening 34b. When stud 36 engages with the engagement pin 70, stud 36 can be located in either opening 34a or 34b of the slot 34. When in opening 34a, the entire stud, including first portion 36a, can fit within the slot 34. In this manner, the entire stud 36 is substantially flush with the housing 30. When stud 36 is tightened such that the first portion 36a is recessed into the first opening 34a, stud 36 locks pin 70 from moving inward toward the center of housing 30. The stud 36 can be configured to require a tool to loosen stud 36 from the locked position. Alternatively, when stud 36 is in slot opening 34b, the stud 36 can only be tightened until the first portion 36a contacts the housing 30, due to the smaller sized configuration of opening 34b. Hence, positioning the stud 36 in slot 34 provides a locking feature to retain the engagement pin 70 in a desired position. Stud 37 and slot 35 operate in an analogous manner.

The housing 30 and fitting 20 can be integrally formed as shown in FIGS. 2A and 2B. In alternate embodiments, however, the housing 30 and fitting 20 can be formed from separate parts and connected during assembly of the tie down 10. In still other embodiments, the housing 30 and fitting 20 can be operably connected so that fitting 20 can pivot about the housing 30 in multiple directions, i.e., can pivot toward the front 31, rear 32, sides, or combinations thereof (front 31 and rear 32 shown in FIGS. 3A and 3B). The housing 30 can be formed from anodized aluminum, stainless steel, graphite or other composite, metal alloys and/or any other rigid material. In other alternate embodiments, the housing 30 can be painted, or coated with a polytetrafluoroethylene, e.g., Teflon®, or at least partially with a reflective coating. In other embodiments, the housing 30 can be painted a color that contrasts with the roller tray 50, caster tray, ball tray, cargo deck or other structure. In addition, indicia can be added to the housing 30.

The first and second engagement pins 70 and 80 are moveable and allow securement and rotation of the fitting 20, housing 30, or both within a roller tray 50, or other structure as described herein. An engagement pin can be any device capable of engaging an opening or a receiving hole 58. For example, an engagement pin can be a pin, rod, dowel, cylinder, shaft, mandrel, flat rod, square rod, a tube, bolt, or solid or hollow variants of any of the above, configured as appropriate for operation as discussed herein. In other embodiments, the first and second engagement pins 70 and 80 can have a curvilinear profile similar to an ellipsoid, conic surface, a single sheet hyperboloid, or variants thereof. The exterior surface of the first and second engagement pins 70 and 80 are designed and configured to facilitate rotational movement within the receiving holes 58. The first and second engagement pins 70 and 80 can generally extend outward from the housing 30 to engage receiving holes 58 when the tie down 10 is deployed in the roller tray 50, as shown in FIG. 1. In the embodiment shown in FIGS. 2A and 2B, the first and second engagement pins 70 and 80 are moveable within the cavity 33. In alternate embodiments, the first and second engagement pins 70 and 80 can be moveable in relation to the housing 30, but not necessarily within the housing 30. For example, the first and second engagement pins 70 and 80 can be moveable on a housing 30.

Figure 5:
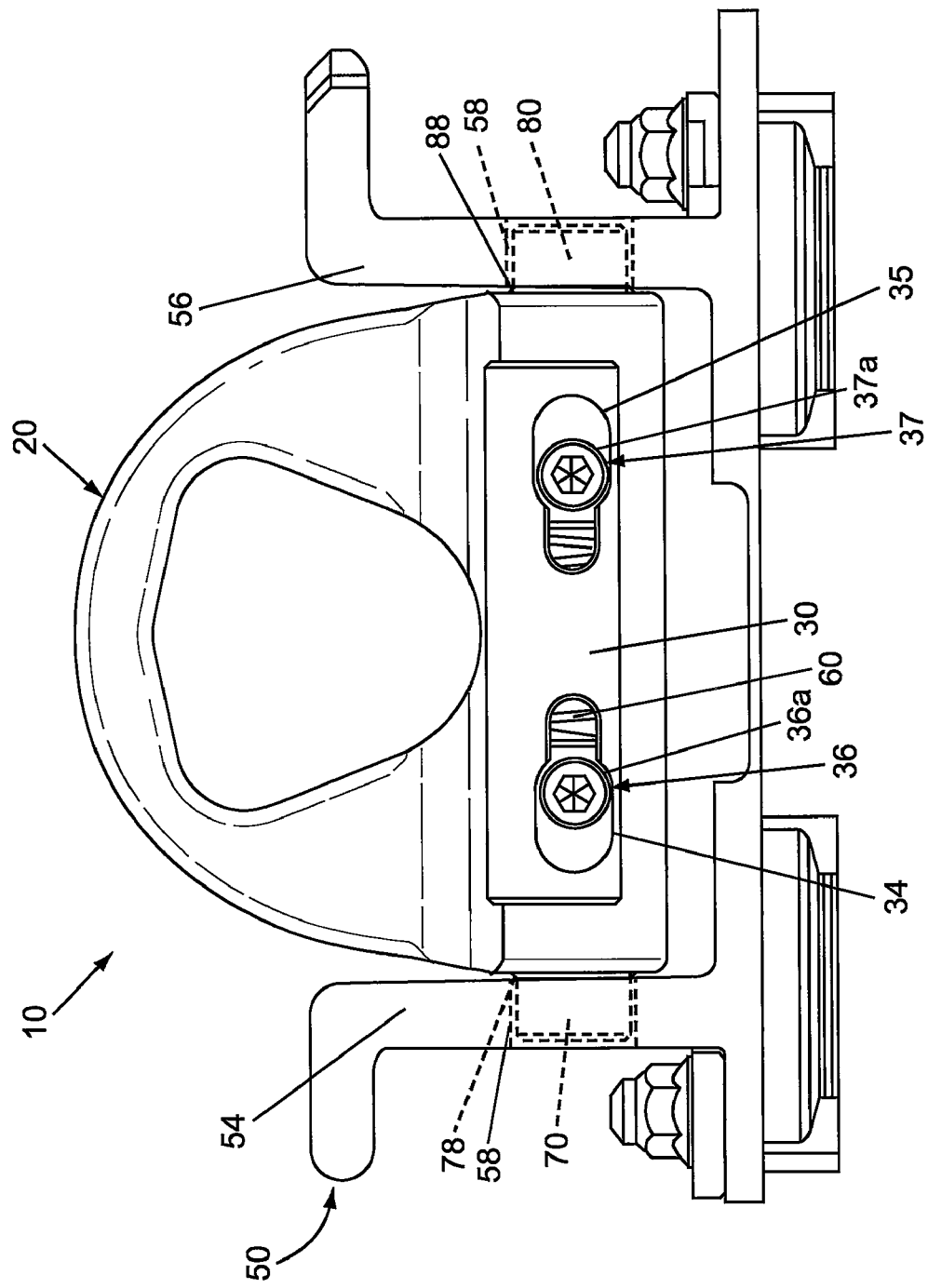
FIG. 5 shows a front view of a first embodiment of a tie down in a roller tray.

The engagement pins 70 and 80 can be configured to fit within or otherwise engage a receiving hole 58. The first engagement pin 70 can have an engagement end 72, ridge 78 and an opening 74. In an embodiment, the engagement end 72 enters a receiving hole 58 on a roller tray 50 as shown in FIG. 5. Thus, the engaging ends 72 and 82 can be a cone, frusto-cone, pyramid, frustopyramid, a cubiod, cube, semi-sphere or a dome or any other shape capable of entering a receiving hole 58. The ridge 78 can rest against the first rail 54 proximate the outer perimeter of the receiving hole 58. The opening 74 can receive a stud 36 inserted within the slot 34 of the housing 30 as described above. In addition, the second engagement pin 80 can have an engagement end 82, ridge 88 and an opening 84 as shown in FIG. 2B.

The engagement pins 70 and 80 can be a solid, integrally formed structure. For example, the first and second engagement pins 70 and 80 can be integrally formed to have engagement ends 72 and 82, as shown in FIG. 2B. In alternate embodiments, however, the engagement pins 70 and 80 can comprise one or more parts. In other alternate embodiments, the engagement ends 72 and 82 can be separate structures and joined to the engagement pins 70 and 80, respectively. The engagement pins 70 and 80 can be painted, or coated with a polytetrafluoroethylene, e.g., Teflon®, or at least partially with a reflective coating. In other alternate embodiments, the engagement pins 70 and 80 can have a solid film lubricant applied during assembly to facilitate rotation within the roller tray 50. In other embodiments, the engagement pins 70 and 80 can be painted a color that contrasts with the roller tray 50, caster tray, ball tray, cargo deck or other structure.

The first and second engagement pins 70 and 80 can be positioned on opposing sides of a spring 60 within cavity 33 as shown in FIGS. 2A and 2B. The spring 60 can apply a force normal to the first and second engagement pins 70 and 80, pushing the engagement ends 72 and 82 outward from the housing 30 and toward the receiving hole 58. The ridges 78 and 88 counter the force of the spring 60 to provide stable engagement between the tie down 10 and the roller tray 50, as shown in FIG. 5. The first and second engagement pins 70 and 80 can then be retracted within the cavity 33 by compressing the spring 60. The spring 60 can be compressed mechanically, i.e., forcing the engagement pins within the cavity 33. In alternate embodiments, however, the spring 60 can be compressed by either squeezing together studs 36 and 37 (as discussed below) or compressed automatically with an electromechanical device. A helical compression spring can be used as shown in FIG. 2B. In alternate embodiments, however, any type of device, spring, or material can be used to force first and second engagement pins 70 and 80 in and out of cooperation with a roller tray 50. Non-limiting examples include a volute spring, flex band, durable foams, or gels.

In alternate embodiments, one engagement pin can be moveable and the other engagement pin can be fixed. For example, one of the engagement pins (70 or 80) can be integrally formed with housing 30, or may be secured or attached to the housing to maintain a fixed position thereto. The other engagement pin (70 or 80) can be moveable within or on the housing 30 to engage a receiving hole 58. In still other alternate embodiments, engagement pins 70 and 80 can be in slidable engagement with a housing 30. For example, the engagement pins 70 and 80 can be independently biased and capable of sliding in and out of the receiving hole 58. In other alternate embodiments, the housing 30 can be secured in the receiving hole 58 with a one engagement pin, bolt or other device as described herein.

In the embodiment shown in FIGS. 2A, 2B, 3A and 4, first and second studs 36 and 37 can move first and second engagement pins 70 and 80 in and out of cooperation with a roller tray 50. As shown in FIG. 4, the second stud 37 can enter a first slot 35, extend into engagement pin opening 84, and a portion of the rear slot 45. The first stud 36 can be used in a similar manner with slot 34. Thus, the studs 36 and 37 can be moved by a user toward the center of the housing 30 to retract first and second engagement pins 70 and 80. Releasing the studs 36 and 37 can allow the spring 60 to force the engagement pins 70 and 80 toward receiving holes 58 in the roller tray 50 as shown in FIG. 5.

The tie down 10 can be removably secured in position on a roller tray 50 as shown in FIG. 5. First and second studs 36 and 37 can be used to lock first and second engagement pins 70 and 80 in the receiving holes 58 of roller tray 50. The stud 36 can fully engage first slot 34, engagement pin opening 74 and rear slot 44 (opening 74 and rear slot 44 shown in FIG. 4). The stud 36 (including portion 36a) can matingly fit within the first opening 34a of the slot 34 to limit movement of the first engagement pin 70 within the cavity 33. Thus, the stud 36 can limit retraction of the first engagement pin 70 from within the receiving holes 58. Similarly, the second stud 37 can engage slot 35 and rear slot 45 to prevent movement of the second engagement pin 80 (opening 84 and rear slot 45 shown in FIG. 4). While the studs 36 and 37 can limit movement of the engagement pins 70 and 80 within the housing 30, the spring 60 biases the engagement pins 70 and 80 into the receiving holes 58. In addition, the ridges 78 and 88 are blocked by first and second rails 54 and 56, respectively, to limit further advance of engagement pins 70 and 80. Thus, the spring bias fully engages end 72 in receiving hole 58. Engaging end 82 can be engaged in receiving hole 58. In the event a user loses, strips, breaks, or otherwise renders first and second studs 36 and 37 inoperable, the engagement pins 70 and 80 can remain in position in roller tray 50.

Engagement pins 70 and 80 can be secured in position in a roller tray 50 using a variety of devices and methods. For example, the engagement ends 72 and 82 can be locked in position in a roller tray 50 with any device or apparatus that can selectively limit movement of the engagement pins 70 and 80. In other alternate embodiments, the engagement ends 72 and 82 can have a slot (not shown) proximate the ends that can receive a locking pin. The locking pin can be inserted in the slot when the engagement pins 70 and 80 have fully engaged the receiving holes 58 and extend a distance beyond the rails 54 and 56 of the roller tray 50. Thus, the locking pin can limit retraction of the engagement pins 70 and 80 from within the receiving holes 58. In other alternate embodiments, a switch on the housing 30 can activate a rod (not shown) that extends out from the engagement ends 72 and 82. The rod can be activated when the engagement pins 70 and 80 have fully engaged in the receiving holes 58 as described above. In other alternate embodiments, a ratchet device (not shown) can have engagement pins 70 and 80 operably connected to a handle that can be rotatable. As the handle rotates in one direction the engagement pins 70 and 80 can extend from the housing 30 into secure engagement with the roller tray 50 and fixed in position. Rotating the handle in the opposite direction can retract the engagement pins 70 and 80 within the housing and allows the tie down 10 to be removed from the roller tray.

Several features in the tie down 10 accommodate the rigors of flight. For example, as shown in FIG. 4, a locking helical coil 76 can be installed in the engagement pins 80 to discourage the stud 37 from backing out of the housing 30 due to vibrations during flight. In addition, the front and rear slots 35 and 45 are configured to receive stud 37 so that rotation of the engagement pins 70 and 80 within the cavity 33 is allowed. For example, when the stud 37 is fully engaged in slot 35, engagement pin 80 is limited to only about ±2.5 degrees within the cavity 33 in either direction, e.g., either clockwise or counter clockwise in the cavity 33 in the view shown in FIG. 4. The tolerance can help reduce, or limit excessive rotation of the engagement pins 70 and 80 within the receiving hole 58 during flight by allowing some rotation of the pin within the cavity 33.

Figure 6A:
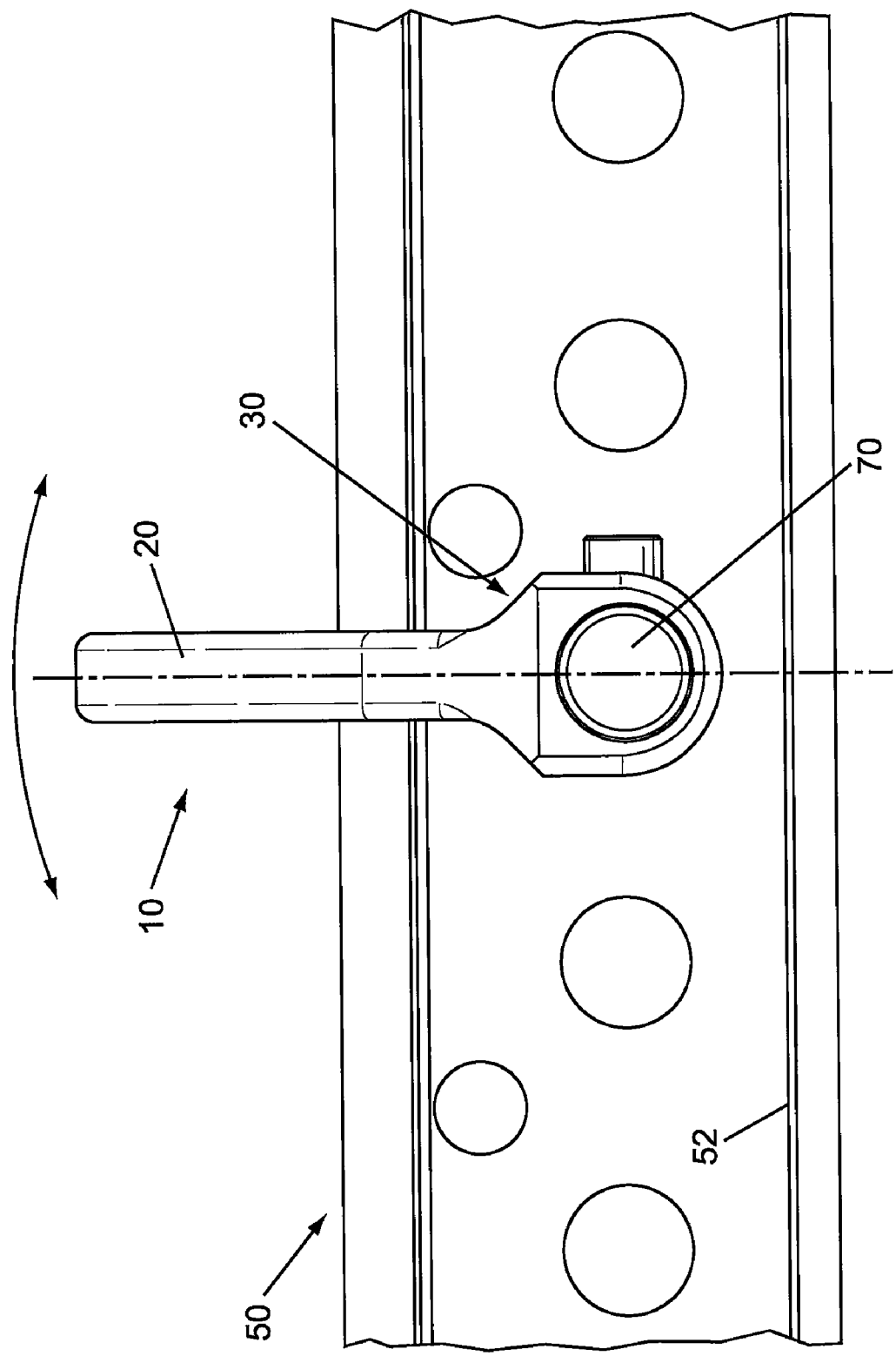
FIGS. 6A, 6B, and 6C show side views of a first embodiment of a tie down in a roller tray with a side rail cut away.
Figure 6B:
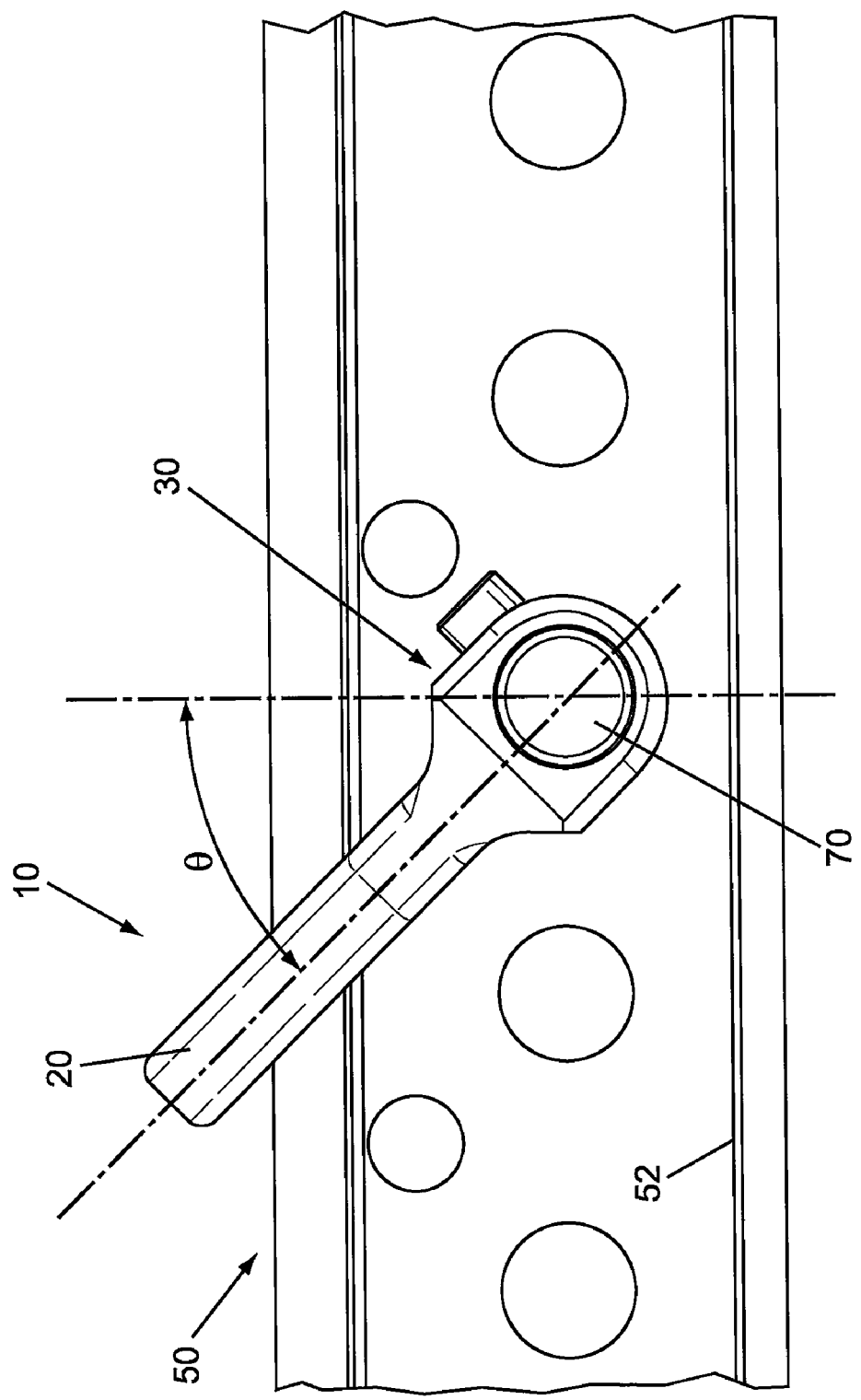
Figure 6C:
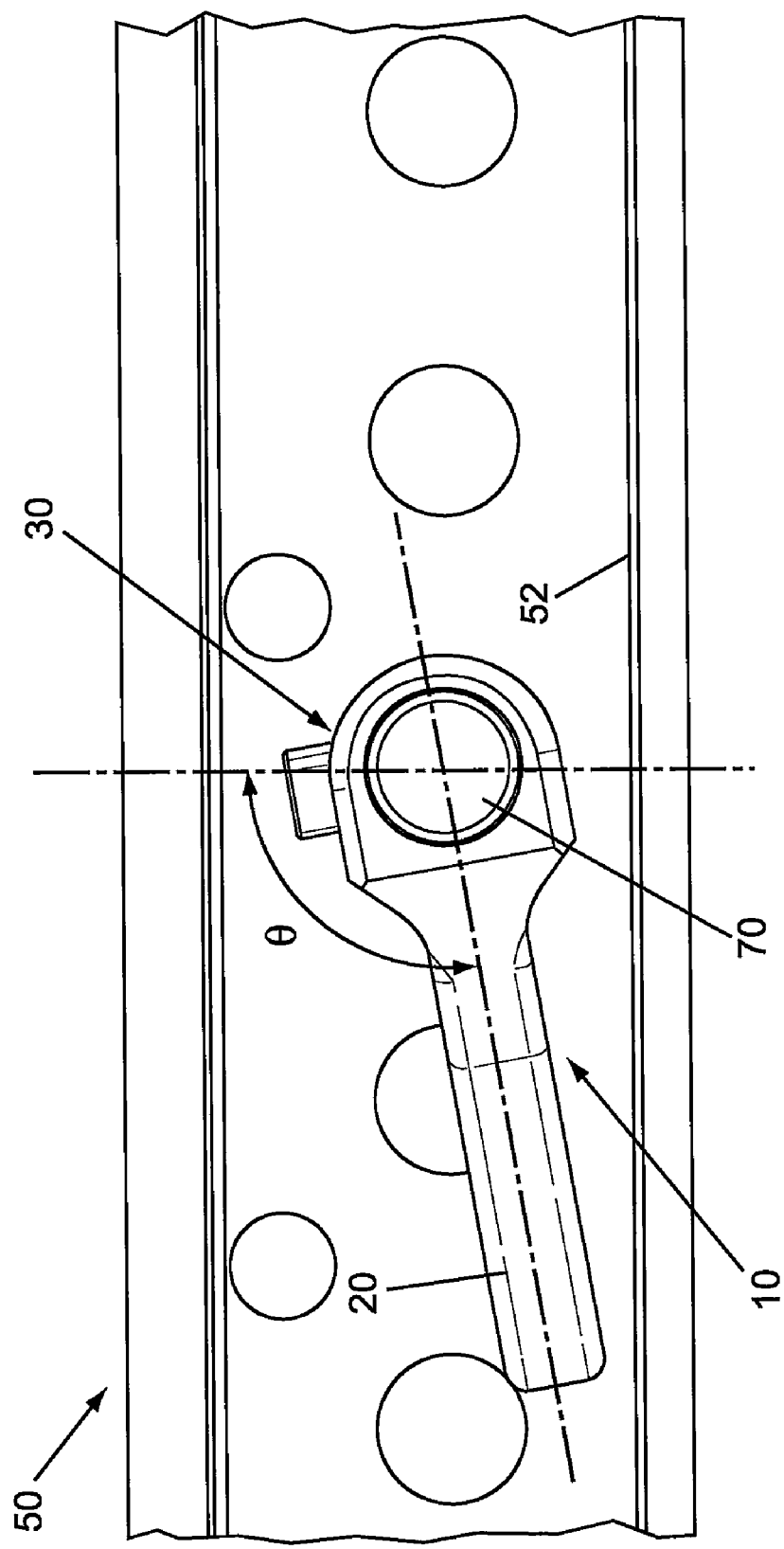

FIGS. 6A, 6B and 6C illustrate rotation of a tie down 10 in a roller tray 50. By allowing a tie down 10 to rotate as needed to receive a restraint strap, the load on a restraint strap can be distributed to the roller tray 50 more efficiently. In an embodiment, the tie down 10 can freely rotate about the first and second engagement pins 70 and 80. For example, the tie down 10 can have axis of rotation of about 200 degrees within the roller tray 50 in the direction of the bi-directional arrow in FIG. 6A. As shown in FIG. 6B, the longitudinal axis of a tie down 10 can form an angle θ, measured from a line substantially orthogonal to the roller tray base 52. In FIG. 6A, the tie down 10 is shown upright in the roller tray 50 and orthogonal to the roller tray base 52. In FIG. 6B, the tie down 10 is shown at a θ angle of about 45 degrees. In FIG. 6C, the tie down 10 is shown in the roller tray 50 at an angle θ of about 95 degrees. In other embodiments, the tie down 10 can be secured in a caster tray, ball tray or machined receiving holes so that the axis of rotation exceeds about 200 degrees. In still other embodiments, the tie down 10 can be secured in roller tray or other structure as described herein to have an axis of rotation less than about 200 degrees.

The tie down 10 can rotate freely to receive the restraint. The tie down 10 can rotate in either a forward direction or aft direction when the roller tray 50, caster tray, or ball tray is installed in a forward-to-aft direction. In alternate embodiments, however, the fitting 20 can be designed to rotate in any direction. For example, the housing 30 can engage receiving hole 58 and a fitting 20 can be secured on a rotatable surface plate on the housing 30 (not shown). In other embodiments, the fitting 20 can be connected to a rotatable rod operably connected to the housing 30. In other alternate embodiments, the tie down 10 can rotate in either an outboard or inboard direction to receive a restraint when the roller tray 50 is positioned outboard-to-inboard, i.e., positioned across the width of the aircraft. In alternate embodiments, the housing 30 can be fixedly engaged in the receiving hole 58 while the fitting 20 can rotate in any direction to receive a restraint.

Figure 7D:
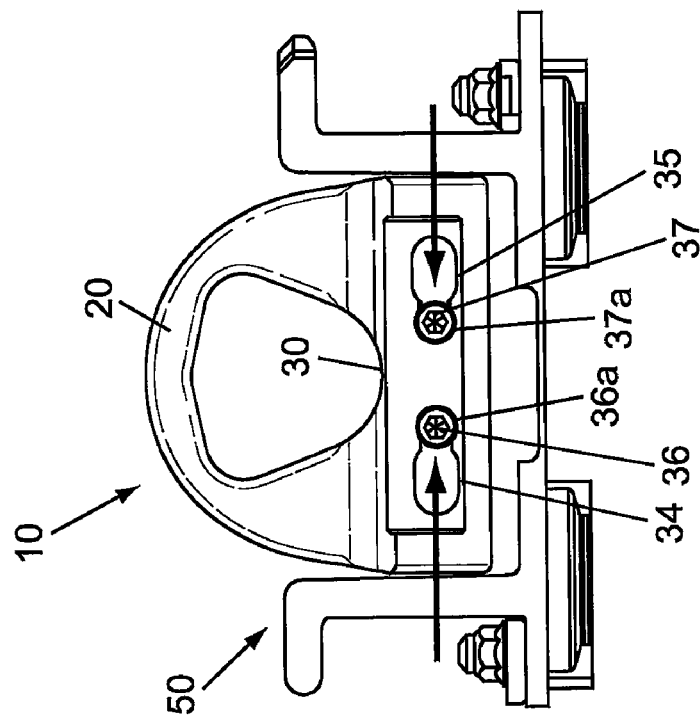
Figure 7C:
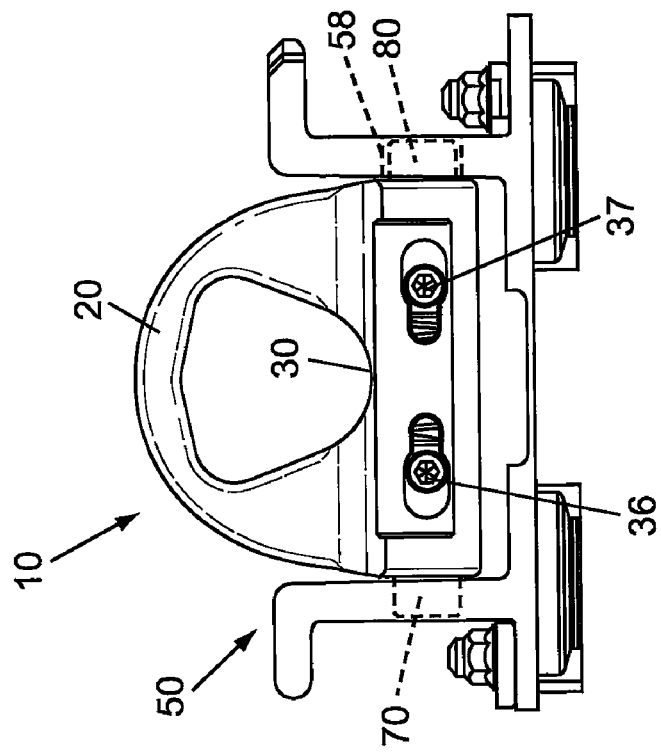

A method of using a moveable tie down 10 to secure objects in an aircraft is shown in FIGS. 7A through 7F. A user selects a location in the roller tray 50 to install the tie down 10. Using studs 36 and 37, the engagement pins 70 and 80 are retracted within the housing 30 as shown in FIG. 7A. The tie down 10 can be placed in the roller tray 50 as shown in FIG. 7B. Once studs 36 and 37 are released, the spring 60 can force the first and second engagement pins 70 and 80 toward roller tray 50 and into cooperation with the receiving holes 58. The studs 36 and 37 can be tightened into the slots 34 and 35 so that engagement pins 70 and 80 are locked in an extended position in the roller tray 50 as shown in FIGS. 7B and 7C. The studs 36 and 37 may also be kept loose as needed. The tie down 10 can be rotated in a roller tray 50 to receive a restraint.

Figure 7F:
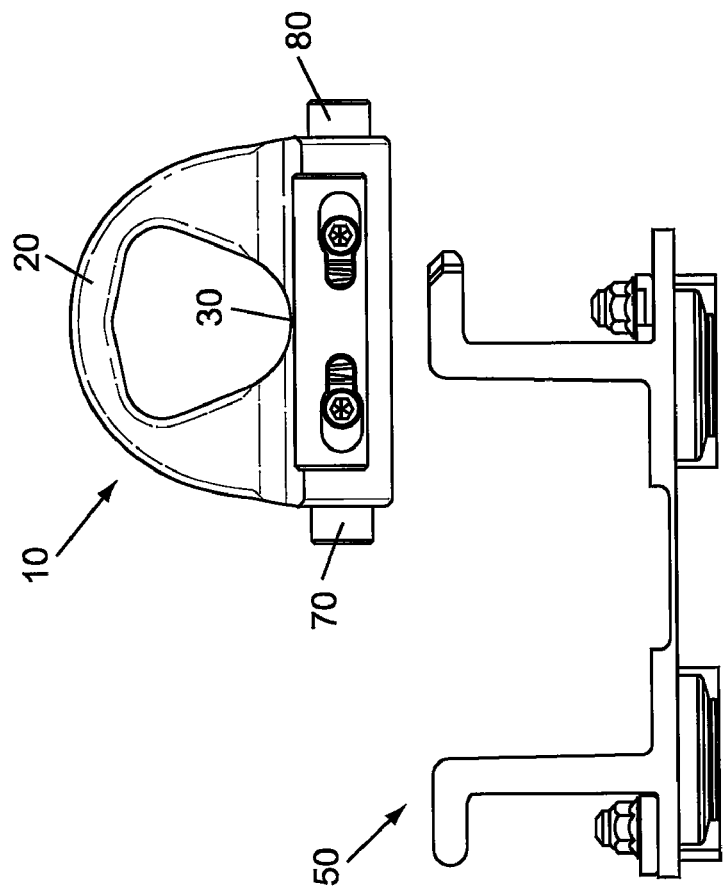
Figure 7E:
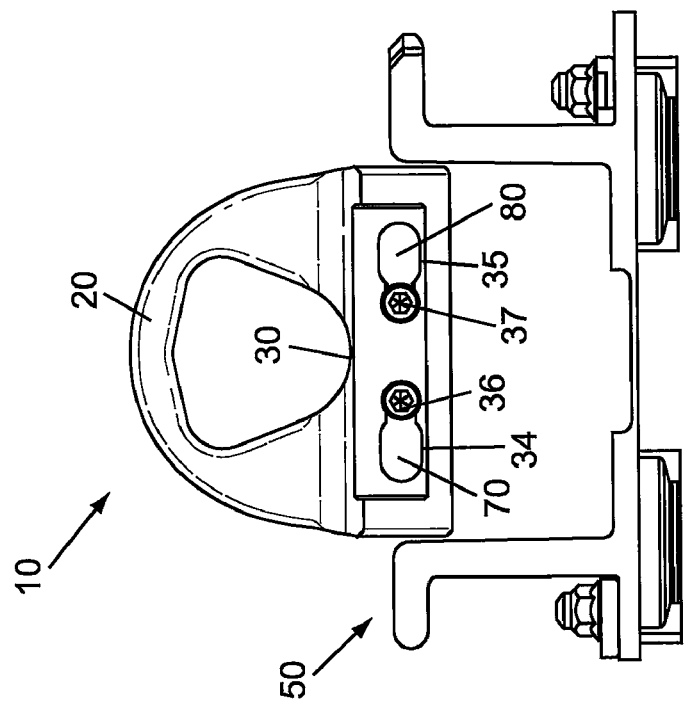

A user can remove the tie down 10 as shown in FIGS. 7D, 7E and 7F. The studs 36 and 37 (not shown) can be disengaged from slots 34 and 35 to permit movement of the engagement pins 70 and 80. The studs 36 and 37 can be moved toward the center of the housing 30 to retract the first and second engagement pins 70 and 80 as shown in FIG. 7D. A user can optionally lock the engagement pins 70 and 80 in a retracted position by tightening the studs 36 and 37 to the outer surface of housing 30. With the engagement pins 70 and 80 retracted within the housing 30, the tie down 10 can be removed from the roller tray 50 as shown in FIG. 7E. The tie down 10 can be moved to another position along a roller tray 50.

An alternate embodiment is shown in FIGS. 8, 9 and 10. In the embodiment shown in FIG. 8, a tie down 110 can have a double studded fitting 120, housing 130 and first and second engagement pins 170 and 180. The studs 136 and 137 can be used to retract the first and second engagement pins 170 and 180 within the housing 130 as described above. The tie down 110 can be selectively positioned and secured in a roller tray 150 as shown in FIG. 9. A latch 190 can engage the fitting 120 to permit securing a restraint from cargo thereto as shown in FIG. 10.

The above descriptions of various embodiments of the invention are intended to describe and illustrate various engagement pins and aspects of the invention. Persons of ordinary skill in the art will recognize that certain changes and modifications can be made to the described embodiments without departing from the scope of the invention. All such changes and modifications are intended to be within the scope of the appended claims.

We claim:

1. A system for securing objects in an aircraft, the system comprising:
 a structure in an aircraft having a plurality of receiving holes;
 a tie down comprising a housing and a fitting;
 the housing rotatably mounted on the structure along a housing axis of rotation and having at least one engagement pin positioned at least partially within at least one of the plurality of receiving holes;
 the at least one engagement pin being moveable, relative to the housing, between:
  an extended position in which the at least one engagement pin is positioned at least partially within at least one of the plurality of receiving holes; and
  a retracted position in which the at least one engagement pin is no longer positioned in said at least one of the plurality of receiving holes;
 wherein:
 the fitting is capable of receiving and securing a restraint to the housing; and
 when the engagement pin is in the extended position and at least partially positioned within said at least one of the plurality of receiving holes, the housing is configured to rotate about the engagement pin.

2. The system as in claim 1, wherein the housing further comprises a means for moving the at least one engagement pin into engagement with at least one of the plurality of receiving holes.

3. The system as in claim 1, further comprising:
 a stud extending in a direction transverse to the housing axis of rotation, the stud engaging the least one engagement pin and capable of preventing the at least one engagement pin from moving to the retracted position.

4. The system as in claim 1, wherein the housing comprises a cavity, the cavity having a spring that extends the at least one engagement pin from within the housing at least partially into at least one of the plurality of receiving holes.

5. The system as in claim 1, wherein the fitting comprises a shackle, single stud fitting, double stud fitting, or a latch.

6. The system as in claim 3, wherein the stud is capable of locking the at least one engagement pin in the retracted position.

7. The system as in claim 3, wherein the housing comprises a first slot on a front side of the housing and a second slot on a rear side of the housing, and wherein the stud extends through the first slot, the at least one engagement pin, and a portion of the second slot.

8. The system as in claim 1, wherein removal of the tie down from the structure is permitted when the at least one engagement pin is in the retracted position.

9. The system as in claim 1, wherein:
 the housing comprises a front side, a rear side, and a cavity between the front and rear sides;
 the engagement pin is at least partially located in, and moveable relative to, the cavity;
 the housing further comprises a first slot formed on the front side of the housing, the first slot extending through to the cavity;
 a first stud extends through said first slot and into the cavity in a direction transverse to the housing axis of rotation, the first stud being adjustable between:
  a first position in which the first stud prevents movement of said engagement pin from the retracted position to the extended position; and
  a second position in which the first stud prevents movement of said engagement pin from the extended position to the retracted position.

10. The system as in claim 9, wherein:
 the first slot comprises a first opening connected to a smaller second opening;
 the first stud comprises a first portion connected to a smaller second portion; and
 the first portion of the first stud is capable of entering the first opening but is too small to enter the second opening.

11. The system as in claim 9, wherein:
 the housing has a second slot on the rear side of the housing; and the first stud extends through the first slot, the at least one engagement pin, and a portion of the second slot.

12. The system as in claim 1, wherein:
the housing comprises a front side, a rear side, and a cavity between the front and rear sides;
the housing has first and second engagement pins, each engagement pin being at least partially located in, and movable relative to, opposite ends of the cavity;
the housing further comprises first and second slots formed on the front side of the housing, the first and second slots communicating with the cavity; and
first and second studs extend through respective ones of said first and second slots and into the cavity, in a direction transverse to the housing axis of rotation, the first and second studs each being adjustable between:
a first position in which the first and second studs prevent movement of respective ones of said first and second engagement pins from the retracted position to the extended position; and
a second position in which the first and second studs prevent movement of respective ones of said first and second engagement pins from the extended portion to the retracted position.

13. The system as in claim 12, wherein:
each of first and second slots comprises a first opening connected to a smaller second opening;
each of the first and second studs comprises a first portion connected to a smaller second portion; and
the first portion of each of the first and second studs is capable of entering the first opening but is too small to enter the second opening.

14. The system as in claim 12, wherein:
the housing has spaced apart third and fourth slots on the rear side of the housing;
the first stud extends through the first slot, the first engagement pin, and a portion of the third slot; and
the second stud extends through the second slot, the second engagement pin, and a portion of the fourth slot.

15. The system as in claim 1, wherein:
the housing comprises a second engagement pin that is fixed and thus not moveable, relative to said housing, between the extended position and the retracted position;
the second engagement pin is positioned at least partially within a second of said plurality of receiving holes, when the housing is rotatably mounted on the structure.

16. A system for securing objects in an aircraft, the system comprising:
a structure in an aircraft having a plurality of receiving holes;
a tie down comprising a housing and a fitting connected to the housing, the fitting capable of receiving and securing a restraint to the housing, the housing rotatably mounted to the structure along a housing axis of rotation and comprising:
a front side, a rear side, and a cavity between the front and rear sides;
at least one engagement pin at least partially located in the cavity, and moveable relative to the cavity between an extended position and a retracted position;
at least one slot formed on the front side of the housing, the at least one slot extending through to the cavity; and
at least one stud extending through the at least one slot and into the cavity, in a direction transverse to the housing axis of rotation, the at least one stud capable of being adjusted between:
a first position in which the at least one stud prevents movement of said engagement pin from the retracted position to the extended position; and
a second position in which the at least one stud prevents movement of said engagement pin from the extended position to the retracted position;
wherein:
the housing is rotatably mounted to the structure with said engagement pin in the extended position and at least partially positioned within a first of the plurality of receiving holes.

17. The system as in claim 16, wherein:
the housing comprises first and second engagement pins, each engagement pin being at least partially located in, and movable relative to, opposite ends of the cavity,
the housing comprises first and second slots formed on the front side of the housing, the first and second slots communicating with the cavity; and
the housing comprises first and second studs extending through respective ones of said first and second slots in a direction transverse to the housing axis of rotation, the first and second studs each being adjustable between:
a first position in which the first and second studs prevent movement of respective ones of said first and second engagement pins from the retracted position to the extended position; and
a second position in which the first and second studs prevent movement of respective ones of said first and second engagement pins from the extended portion to the retracted position.

18. The system as in claim 17, wherein:
each of first and second slots comprises a first opening connected to a smaller second opening;
each of the first and second studs comprises a first portion connected to a smaller second portion; and
the first portion of each of the first and second studs is capable of entering the first opening but is too small to enter the second opening.

19. The system as in claim 17, wherein:
the housing has spaced apart third and fourth slots on the rear side of the housing;
the first stud extends through the first slot, the first engagement pin, and a portion of the third slot; and
the second stud extends through the second slot, the second engagement pin, and a portion of the fourth slot.

20. The system as in claim 16, wherein:
the housing comprises a second engagement pin that is fixed and thus not moveable, relative to said cavity, between the extended position and the retracted position; and
the second engagement pin is positioned at least partially within a second of said plurality of receiving holes, when the housing rotatably mounted on the structure.

* * * * *